US010766830B2

(12) United States Patent
Jain et al.

(10) Patent No.: US 10,766,830 B2
(45) Date of Patent: Sep. 8, 2020

(54) COMPOSITIONS WITH SOLID FUEL LOADED ON GRAPHENE FOAMS

(71) Applicant: Purdue Research Foundation, West Lafayette, IN (US)

(72) Inventors: Shourya Jain, West Lafayette, IN (US); Li Qiao, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 298 days.

(21) Appl. No.: 15/933,452

(22) Filed: Mar. 23, 2018

(65) Prior Publication Data

US 2018/0282240 A1 Oct. 4, 2018

Related U.S. Application Data

(60) Provisional application No. 62/478,637, filed on Mar. 30, 2017.

(51) Int. Cl.
| | | |
|---|---|---|
| C06B 45/00 | (2006.01) | |
| C06B 25/06 | (2006.01) | |
| C06B 47/14 | (2006.01) | |
| C01B 32/184 | (2017.01) | |
| C06B 25/34 | (2006.01) | |
| C06B 21/00 | (2006.01) | |
| C06B 23/00 | (2006.01) | |
| C01B 32/186 | (2017.01) | |
| C01B 32/182 | (2017.01) | |
| D03D 23/00 | (2006.01) | |
| D03D 43/00 | (2006.01) | |

(52) U.S. Cl.
CPC ............ *C06B 25/06* (2013.01); *C01B 32/182* (2017.08); *C01B 32/184* (2017.08); *C01B 32/186* (2017.08); *C06B 21/0083* (2013.01); *C06B 23/007* (2013.01); *C06B 25/34* (2013.01); *C06B 47/145* (2013.01); *C01B 2204/04* (2013.01); *C01B 2204/32* (2013.01)

(58) Field of Classification Search
USPC .......................... 149/2, 108.2, 109.4, 109.6
See application file for complete search history.

(56) References Cited

U.S. PATENT DOCUMENTS

| | | | | |
|---|---|---|---|---|
| 7,833,366 | B1 * | 11/2010 | Forohar | B82Y 30/00 |
| | | | | 149/109.6 |
| 7,837,813 | B1 * | 11/2010 | Barker | H01M 6/36 |
| | | | | 149/108.2 |
| 7,879,166 | B1 * | 2/2011 | Forohar | B82Y 30/00 |
| | | | | 149/35 |
| 2015/0034220 | A1 * | 2/2015 | Gangopadhyay | C06B 21/0008 |
| | | | | 149/3 |

FOREIGN PATENT DOCUMENTS

CN 102745679 A * 10/2012

OTHER PUBLICATIONS

S. Jain, et al., Flame speed enhancement of a nitrocellulose monopropellant using graphene microstructures, Journal of Applied Physics, 2016, 120, 174902-01 to 74902-10 (2016).

* cited by examiner

*Primary Examiner* — James E Mcdonough
(74) *Attorney, Agent, or Firm* — Purdue Research Foundation; Zhigang Rao

(57) ABSTRACT

The present application generally relates to compositions with solid fuel loaded on graphene foams (GFs) for enhanced burn rates, and methods of making and using the compositions with solid fuel loaded on graphene foam.

16 Claims, No Drawings

COMPOSITIONS WITH SOLID FUEL LOADED ON GRAPHENE FOAMS

CROSS-REFERENCE TO RELATED APPLICATION

The present U.S. patent application is related to and claims the priority of U.S. Provisional Application Ser. No. 62/478,637, filed Mar. 30, 2017, the contents of which are hereby incorporated by reference in its entirety into this application.

GOVERNMENT RIGHT

This invention was made with government support under FA 9550-13-1-0161 awarded by U.S. Air Force Office of Scientific Research. The government has certain rights in the invention.

STATEMENT REGARDING PRIOR DISCLOSURES BY THE INVENTORS OR JOINT INVENTORS UNDER 37 C.F.R. 1.77(b)(6)

Shourya Jain and Li Qiao, the inventors or joint inventors of the present disclosure, publicly disclosed information related to the present disclosure in article S. Jain, et al., Flame speed enhancement of a nitrocellulose monopropellant using graphene microstructures, *Journal of Applied Physics*, 120, 174902 (2016). The article was first published online on Nov. 3, 2016, which is less than one year from the filing date of the U.S. Provisional Application Ser. No. 62/478,637, filed Mar. 30, 2017. The two listed co-authors W. Park and Y. P. Chen of the article are not inventors for the present disclosure because W. Park and Y. P. Chen only provided supervised contributions instead of providing inventive contribution. A copy of a print out of the article is provided on a concurrently filed Information Disclosure Statement (IDS).

TECHNICAL FIELD

The present application generally relates to compositions with solid fuel loaded on graphene foams (GFs) for enhanced burn rates, and methods of making and using the compositions with solid fuel loaded on graphene foam.

BACKGROUND

This section introduces aspects that may help facilitate a better understanding of the disclosure. Accordingly, these statements are to be read in this light and are not to be understood as admissions about what is or is not prior art.

The control and enhancement of the combustion wave propagation velocities of solid propellants are very important for the development of low cost and efficient solid rockets, solid microthrusters, and thermal-to-electrical energy conversion devices.

Enhancing the burn rate of solid fuels/propellants by either adding metal/metal oxide additives or varying the fuel/oxidizer particle size is well known in the art. However, the addition of metal/metal oxide additives in the propellant mixture has several known disadvantages: (1) the propellant mixture is more sensitive to accidental initiation due to impact, friction, spark, flame, or heat; (2) the condensed solid metal particles in the exhaust being detrimental to the hardware because of their abrasive action; and (3) the toxic exhausts from the combustion of metals.

There is, therefore an unmet need for novel solid fuel/propellant compositions and methods to make and use of the novel solid fuel/propellant compositions.

SUMMARY

One of the primary objectives of the present disclosure is to provide compositions with solid fuel loaded on graphene foams that may provide enhanced burn rate for the loaded solid fuel, meanwhile minimize the negative impacts of the traditional burn rate enhancement methods using metal/metal oxide additives. Since the graphene structures usually do not participate in the combustion process, one additional advantage is that there is almost no or minimum solid particles or toxic gases being produced.

In one embodiment, the present disclosure provides a composition comprising a graphene foam; and a solid fuel.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "graphene foam" means material made of a three-dimensional network of a single-layer graphene or a few-layers graphene or ultrathin graphite that extends in all the three dimensions. A graphene foam is composed of pores and pore walls that contain a single-layer graphene or a few-layers graphene or ultrathin graphite material and are hollow in nature. A graphene foam may comprise pristine graphene foam that contains essentially all carbon or non-pristine graphene foams that include but is not limited to graphene fluoride, graphene chloride, or nitrogenated graphene, etc. The non-pristine may contain at least 0.001% by weight of non-carbon elements. In one aspect, the graphene foam may be functionalized with one or more metals, metal oxides, or chemical functional groups. Metal oxides may be but is not limited to $MnO_2$ (Manganese dioxide), $Bi_2O_3$ (Bismuth oxide), $Fe_2O_3$ (Iron oxide), $Co_3O_4$ (Cobalt oxide), CuO (Cupric oxide), $Cu_2O$ (Cuprous oxide), PbO (Lead oxide), NiO (Nickel oxide), $SnO_2$ (Tin oxide), $TiO_2$ Titanium dioxide), $CeO_2$ (Cerium oxide), MgO (Magnesium oxide), $Al_2O_3$ (Aluminium oxide), ZnO (Zinc oxide), CdO (Cadmium oxide), $Nd_2O_3$ (Neodymium oxide), $WO_3$ (Tungsten oxide), $Bi_2WO_6$, etc. or any combination thereof. Chemical functional groups may be but is not limited to carboxylates, hydroxides, epoxides, nitro, ketones, or any combination thereof.

Carbon-based materials, such as carbon nanotubes (CNTs), graphene nano-pellets (GNPs) and graphene foams, because of their high thermal (100-4600 W/mK) and electrical conductivity, mechanical strength, optical properties, and large surface-to-volume ratio, have been used as nano-fillers to enhance the thermal conductivity of various composites.

In addition to enhancing the thermal conductivity, certain carbon nanomaterials may augment the burn rate of certain solid monopropellants. For example, graphite sheets were used to enhance the burn rate of solid nitrocellulose monopropellant. See S. Jain, O. Yehia, and L. Qiao, *Journal of Applied Physics* 119, 094904 (2016). However, there is still a need to develop solid fuel compositions with enhaced burn rates that may lead to improved performance in devices such as solid rocket motors. Desired solid fuel compositions should also have higher solid fuel loading (total mass of the solid fuel per total mass of both the solid fuel and the carbon-based materials). The substrate to load the solid fuel should also be re-usable and have little or no negative impact to the use of the solid fuels in devices such as solid rocket motors.

The present disclosure provides compositions with solid fuel loaded on graphene foams (GFs) for enhanced burn rates. Comparing to the previously disclosed effort such as loading solid fuel on graphene sheet, graphene nano-pellets, the present compositions with solid fuel loaded on graphene foams (GFs) provides a significantly improved fuel loading, improved burn rate, and improved re-usability. This is unexpected since in the previous disclosures of graphene sheet or graphene nano-pellets, solid fuels are normally loaded only as a thin layer on top of such materials. When the loading of significantly more solid fuel in material such as graphene foam, the amount of solid fuel to that of the graphene foam structure may be expected to be too high and may not enhance the burn rate performance.

In one embodiment, the present disclosure provides a composition comprising a graphene foam and a solid fuel.

In one embodiment, the present disclosure provides a composition comprising a graphene foam and a solid fuel, wherein the graphene foam has an average porosity of 50.0-99.99%. In one embodiment the graphene foam has an average porosity of 60.0-99.99%. In one embodiment the graphene foam has an average porosity of 70.0-99.99%. In one embodiment the graphene foam has an average porosity of 80.0-99.99%. In one embodiment the graphene foam has an average porosity of 90.0-99.99%.

In one embodiment, the present disclosure provides a composition comprising a graphene foam and a solid fuel, wherein the solid fuel loading of said solid fuel is 10-99%. In one embodiment the solid fuel loading of said solid fuel is 20-95%. In one embodiment the solid fuel loading of said solid fuel is 30-90%. In one embodiment the solid fuel loading of said solid fuel is 40-80%. In one embodiment the solid fuel loading of said solid fuel is 45-75%. In one embodiment the solid fuel loading of said solid fuel is 50-60%.

In one embodiment, the present disclosure provides a composition comprising a graphene foam and a solid fuel, wherein the solid fuel is a solid propellant. In one embodiment, the solid propellant may comprise one or more monopropellant that is selected from but is not limited to nitrocellulose, RDX (Cyclotrimethylenetrinitramine), CL-20 (Hexanitrohexaazaisowurtzitane), HMX (Cyclotetramethylene tetranitramine), FOX-7 (1,1-diamino-2,2-dinitroethene), PETN (pentaerythritol tetranitrate), TNT (trinitrotoluene), TNA (trinitroaniline), TATB (triaminotrinitrobenzene), TNP (picric acid), TNB (1,3,5-trinitrobenzene), or any combination thereof. In one embodiment, the solid fuel may comprise one or more double-based propellant, wherein the double-based propellant may be nitrocellulose mixed with one or more metal or metal oxide additives in various proportions. In one embodiment, the solid propellant may comprise one or more composite propellant, wherein the composite propellant may comprise an oxidizer such as ammonium perchlorate, ammonium nitrate, potassium perchlorate or potassium nitrate; a metal fuel such as boron, ammonium, magnesium and/or their oxides; and a binder such as HTPB (hydroxyl-terminated polybutadiene), rubber, nitropolymer, polyurethane, thiokol, asphalt, PBAN (polybutadiene acrylonitrile), polyglycidyl nitrate or polyvinyl nitrate, wherein the oxidizer, the metal fuel and the binder are mixed together in various proportions.

In one embodiment, the present disclosure provides a method to prepare a composition comprising a graphene foam and a solid fuel. The method comprises preparing a graphene foam material with appropriate porosity; preparing a solution of an appropriate solid fuel; depositing the solid fuel solution onto the graphene foam; drying and removing all or substantially all the solvent used for preparing the solid fuel solution.

In one aspect, the solvent used to preparing the solid fuel solution may be any appropriate organic or inorganic solution. In one aspect, the solvent is an organic solvent such as acetone.

In one aspect, any presently disclosed composition comprising a graphene foam and a solid fuel may be used for microthrusters. Microthrusters are used in applications where a small amount of thrust is required, e.g., precise altitude control and orbit transfer. By adding highly conductive thermal materials such as GF, one can increase the burn rate (or specific impulse) of the propellant and vary the thrust (by varying the propellant-to-graphene mass ratio). Moreover, since the graphene structures do not participate in the combustion process, no solid particles or toxic gases are produced in the rocket exhaust, in contrast to the traditional metal/metal oxide additives.

Example 1: Nitrocellulose Loaded Graphene Foam

The graphene foam in the present disclosure may be prepared following the method outlined by Chen et al (*Nat Mater* 10, 424, 2011). Three-dimensional flexible and conductive interconnected graphene networks were grown on a Ni template (3 mm-thick open-cell foam with 75 pores per inch) by the chemical vapor deposition (CVD) method with flowing a gas mixture of $CH_4$ (20 sccm), $H_2$ (20 sccm), and Ar (210 sccm) at 1050° C. The exact growth time controlled the density of the GF. The uncertainty associated with the obtaining the GF density was +/−2 mg/cm$^3$. After the growth process, the GF/Ni surface was drop-casted with a polymethyl methacrylate (PMMA) solution to protect the structure from the vigorous etching process. The Ni template was then etched out by first using a $Fe(NO_3)_3$ solution (1 M) at 90° C. for 2 days and then using a HCl (1 M) solution at 90° C. for next 2 days. After the etching process, the samples were rinsed with deionized water and then hot acetone to completely dissolve the PMMA away. The final GF sheet is cut in the required dimension of 2.5 cm by 0.6 cm. This was done to make sure that the length of the samples was much greater than the width so that the flame fronts obtained were nearly planar. The final GF was 3 mm thick and had an average porosity of 99.2%.

Nitrocellulose ($C_6H_8(NO_2)_2O_5$), with a nitration level of 10.9-11.2%, was selected as the solid fuel because of its ease of combustion at atmospheric conditions and wide use as an energetic polymeric binder in solid rocket motors. In addition, the nitration level of the solid propellant is such that it exhibits deflagration and not detonation during combustion. The nitrocellulose solution (6% in ethanol/diethyl ether) was purchased from Sigma-Aldrich, which was then further diluted using acetone, giving the net NC solution to be 4% by weight.

The Nitrocellulose (NC) solution (4% by weight) was then drop-casted onto the graphene foam sheet surface, at various amounts to get the desired fuel loading ratio % (35 to 99%). After the GF surface was drop-casted with the NC solution, the GF/NC samples were left to dry in the ambient conditions for 24 hours, which gave enough time for all the solvent acetone) to completely evaporate. Moreover, special attention was paid to the fluctuations observed while measuring the sample weight (before ignition). If the fluctuations observed were significant, then the samples were left to dry for a longer time. The samples were considered dried only when there were no fluctuations in the weight measurement and a constant weight was achieved. Moreover, the thermogravimetric analysis (TGA) analysis of GF before and after fuel addition was conducted, up to 100° C. at a rate of 10° C./min, to make sure that there was no residual solvent (acetone) prior to combustion. The GF-NC sample was evaporated at the ambient conditions for 24 hours before conducting the TG analysis. Negligible loss (<1%) in the GF-NC sample mass was observed, thus confirming that there is no residual solvent after the evaporation process. The ignition of the samples was achieved by using a resistive heating nichrome wire. A constant voltage was applied across the wire to ignite the fuel samples.

The fuel loading is defined as the mass of the fuel per total mass of the system (fuel+GF). With a decrease in the fuel loading ratio %, the morphology of the GF foam structure was more clearly visible, because of the decreased deposited fuel thickness on the graphene foam strut walls. Special precautions were made to make sure that during the deposition process the NC fuel solution wets most the GF strut walls. This was done by diluting the NC solution with more acetone so that it could easily enter the pores. Thus after the evaporation process, a thin layer of fuel was left coating the inner and outside areas of the GF walls, thus providing an inter-connected GF-NC network for the heat conduction during the combustion process Example 2 (as the Comparison Example to Example 1): Nitrocellulose Loaded Graphene Nano-Pellets (GNP)

For the GNPs-doped NC films, the GNPs (A-12-25G, Graphene Laboratories) were added to the base NC solution at various concentrations ranging from 1-5% of the NC weight. An ultrasonic disruptor was used to disperse the GNPs evenly in the base NC solution and to minimize agglomeration. A series of four-second-long and four-second apart pulses were used for 8 minutes. The GNP/NC solution was then drop-casted onto a thermally insulating glass slide (2.5 cm long and 0.6 cm wide) and evaporated at ambient conditions leaving an adhesive coating of GNP-NC behind. For all the cases tested, the GNP-doped fuel layers had a thickness of 500±30 µm.

The GNPs were less than 3 nm thick (3-8 graphene monolayers) with lateral dimensions ranging between 2 and 8 µm. For all the experiments conducted, the dimensions of the GNP-doped fuel layer were kept constant to 2.5 cm by 0.6 cm.

Burn Rate (Flame Speed) Determination

The burn rate was determined by using the algorithm as disclosed in S. Jain, O. Yehia, and L. Qiao, Flame speed enhancement of solid nitrocellulose monopropellant coupled with graphite at microscales, *Journal of Applied Physics* 119, 094904 (2016). The brightest peaks of the intensity profiles were tracked. An infrared camera (FLIR-SC6100) was used to capture these intensity profiles and the flame propagation. Based on the spatial and the temporal uncertainty of 2% and 6% respectively, the net uncertainty in the determining the burn rates came out to be less than 6.5%. No quantitative temperature measurements were done for the burn rate calculations but only the relative values of the intensity profiles used. A K-type thermocouple, embedded in the fuel surface, was used to measure the peak surface temperatures.

Result for GNP-NC

As the GNPs were introduced into the fuel solution, the net thermal conductivity of the GNP-doped fuel samples was enhanced. The effective thermal conductivity of the GNPs-NC samples was measured experimentally using a steady state, controlled heat flux method based on one dimensional heat flow between two parallel, isothermal reference materials separated by the GNPs-NC sample of uniform thickness. The reference material was polytetrafluoroethylene (PTFE) with a thermal conductivity of 0.3 W/m-K. A thermal gradient was imposed across the GNPs-NC sample using a hot and a cold surface in contact with the reference materials. The temperature of the hot surface was maintained using an electric type heater with a constant voltage supply, while the temperature of the cold surface was maintained at a fixed temperature using the circulated cold water (20° C.). Three GNPs-NC samples having 0%, 2% and 5% GNPs by weight were tested. The thickness of all the three samples was 1 mm. For each sample, three different measurements were made using three different heat fluxes (temperature ranges). The different heat fluxes were obtained by changing the temperature of the hot surface using the voltage supply, while keeping the temperature of the cold surface fixed at 20° C. The temperature measurements were done using the IR (MWIR-1024) camera. Before the temperature measurements were performed, a calibration using the IR camera was done to get the emissivity values of the reference materials and the GNPs-NC samples. An effective thermal conductivity of 0.092+/−0.01 (W/m-K), 0.123+/−0.01 (W/m-K) and 0.163+/−0.012 (W/m-K) was obtained for GNPs-NC sample having 0%, 2% and 5% GNPs by weight, respectively.

A linear increase in the in the $K_{eff}$ values were obtained with a 70% enhancement for the GNPs-NC sample having 5% GNPs by weight. Thus, for low concentration of GNPs the net effective thermal conductivity of the sample is not high enough to conduct heat efficiently from the exothermic reaction to aid reaction propagation. On the contrary, at high concentrations of GNPs, although the thermal conductivity of the GNP-doped NC complex was a lot higher, the amount of heat energy reaching the unburned portions of the fuel was substantially reduced because some of the energy released during the exothermic reaction was used in heating the GNPs, which acted as heat sinks and thus reduced the reaction propagation rates. In addition, the surface morphologies of the deposited NC films can also affect the burn rate enhancements. Consequently, an optimum concentration was obtained. An optimum concentration of around 3% by weight was obtained for which the average burn rate was around 1.9 cm/s (around 2.7 times the pure NC burn rate of 0.7 cm/s).

The evaluation of fuel sample after combustion demonstrated that GNPs remained unburned after the combustion process, however, their 2-D structure was destroyed. The GNP's high temperature stability results from thermogravimetric analysis (TGA in air) demonstrated that there was only 10% of the weight loss was observed around 500° C. The maximum temperature measured, using a k-type thermocouple, was around 600 K+/−10 K.

Results for GNP-NC and GF-NC

The effect of the fuel loading wt % on the average burn rates for a fixed foam density of 18 mg/cm$^3$ were measured. An optimum fuel loading of around 55 wt % was obtained with burn rates up to 4 cm/s (around 6 times the pure NC burn rate of 0.7 cm/s). Compared to the GNPs, almost 2 times the enhancement was observed. This may be attributed to two factors. First of all, GF has been shown to have the higher basal-plane solid thermal conductivity of thin graphene while avoiding the thermal interface resistance issue found in GNPs. Secondly, GF, because of its inter-connected 3-D structure, provides a continuous thermal conduction path, which does not exist in the case of GNP-doped fuel samples because of the random orientation of the GNPs. Since, the GNPs are 2D carbon materials, the in-plane and through-plane thermal conductivities are significantly different. Thus, the thermal conduction in GNP-doped fuel sample is anisotropic and the orientation can have a significant effect on the net thermal conductivity enhancement. Moreover, in the flame propagation direction, the GNPs are not in direct contact with each other but have fuel in between, which tends to increase the thermal boundary resistance (TBR) value even further. This is in contrast to GF, in which the graphene structure is connected from end to end with a thin fuel deposition around the GF strut walls.

The effect of the GF density on the average burn rates at the optimum fuel loading of 55% were measured. For the GF of density 8 mg/cm$^3$, burn rates up to 5.5 cm/s (around 7.6 times the bulk NC burn rate of 0.7 cm/s) were obtained, which was 2.6 times the burn rate obtained using the GF of density 40 mg/cm$^3$ and 2.9 times the maximum burn rate obtained using the GNPs. As can be seen, a monotonically decreasing trend was observed where the burn rate decreases with increasing GF density, which possibly could be due to the higher crystallographic defects observed in the higher density samples.

Similar to the GNPs, the GF remained unburned after combustion, but in contrast to the GNPs the 3D interconnected network of the GF was also preserved. Moreover, the TGA of pure GF was also conducted in air. Only 5% of weight loss was observed at 900 K. The maximum temperature of the GF observed during the combustion process was 600 K. In addition, the reusability of the GF structure was also tested by re-depositing the GF surface with fuel. The particular case that was considered was with using the GF of density 18 mg/cm$^3$ and with the fuel loading of 25%. Similar burn rates were obtained for the fresh and re-used GF structure, respectively, implying that the thermal properties of the GF remained unchanged after the combustion process Overall, the burn rate (flame speed) enhancement of a nitrocellulose solid monopropellant was shown to occur when coupled to highly conductive graphene structures including GNPs or GF. The high thermal conductivity of these structures facilitates the transfer of heat from the reaction zone to the unburned portions of the fuel, which sustains the propagating exothermic reaction front.

For GNPs, the burn rates were shown to be dependent upon the concentration of the GNPs added. An optimum GNP concentration at 3% was determined which gives the maximum enhancement, 2.7 times the burn rate of pure NC.

For the GF structures, the effect of the fuel loading ratio % and the GF density on the average burn rates were considered. An optimum fuel loading of around 55% was obtained with the burn rates showing a monotonic decreasing trend with increasing the GF density. Burn rate enhancements up to 8 times as that of the pure NC were observed, which was 2.9 times the maximum burn rate obtained using the GNPs. Such a significant improvement was attributed to the GF's unique surface morphologies, which can lead to a difference in the thermal conductivities, contact resistances and NC film surface roughnesses, all of which combine to alter the burn rate enhancements.

Those skilled in the art will recognize that numerous modifications can be made to the specific implementations described above. The implementations should not be limited to the particular limitations described. Other implementations may be possible.

The invention claimed is:

1. A composition comprising a graphene foam and a solid fuel, wherein the graphene foam has an average porosity of 50.0-99.99%.

2. The composition of claim 1, wherein the graphene foam has an average porosity of 90.0-99.99%.

3. The composition of claim 1, wherein solid fuel loading of said solid fuel is 10-98%.

4. The composition of claim 3, wherein solid fuel loading of said solid fuel is 25-75%.

5. The composition of claim 1, wherein the solid fuel comprises a solid propellant.

6. The composition of claim 5, wherein the solid propellant is selected from the group consisting of nitrocellulose, RDX (Cyclotrimethylenetrinitramine), HMX (Cyclotetramethylene tetranitramine), PETN (pentaerythritol tetranitrate), TNT (trinitrotoluene), TNA (trinitroaniline), TATB (triaminotrinitrobenzene), TNP (picric acid), TNB (1,3,5-trinitrobenzene), and any combination thereof.

7. The composition of claim 5, wherein the solid propellant comprises a double-based propellant, wherein the double-based propellant is a mixture of nitrocellulose and one or more metal or metal oxide additives.

8. The composition of claim 5, wherein the solid propellant comprises a composite propellant, wherein the composite propellant comprises an oxidizer selected from the group consisting of ammonium perchlorate, ammonium nitrate, potassium perchlorate, potassium nitrate, and any combination thereof; a metal fuel selected from the group consisting of boron, ammonium, magnesium, and any oxide thereof; and a binder selected from the group consisting of HTPB (hydroxyl-terminated polybutadiene), rubber, nitropolymer, polyurethane, thiokol, asphalt, PBAN (polybutadiene acrylonitrile), polyglycidyl nitrate, and polyvinyl nitrate, wherein the oxidizer, the metal fuel and the binder are mixed together.

9. The composition of claim 1, wherein the solid fuel is loaded throughout the three dimensional structure of the graphene foam.

10. The composition of claim 1, wherein graphene foam can be re-used for at least once after the burn of the loaded solid fuel.

11. The composition of claim 1, wherein the graphene foam is functionalized with one or more metals, metal oxides, or chemical functional groups.

12. The composition of claim 11, wherein said metal oxides are selected from the group consisting of $MnO_2$ (Manganese dioxide), $Bi_2O_3$ (Bismuth oxide), $Fe_2O_3$ (Iron oxide), $Co_3O_4$ (Cobalt oxide), CuO (Cupric oxide), $Cu_2O$ (Cuprous oxide), PbO (Lead oxide), NiO (Nickel oxide), $SnO_2$ (Tin oxide), $TiO_2$ Titanium dioxide), $CeO_2$ (Cerium oxide), MgO (Magnesium oxide), $Al_2O_3$ (Aluminium oxide), ZnO (Zinc oxide), CdO (Cadmium oxide), $Nd_2O_3$ (Neodymium oxide), $WO_3$ (Tungsten oxide), $Bi_2WO_6$, and any combination thereof.

13. The composition of claim 1, wherein the composition is used for microthrusters.

14. A method of preparing the composition of claim 1, wherein the method comprises preparing a solution of the solid fuel in a solvent; depositing the solution onto the graphene foam; drying and removing all or substantially all the solvent used for preparing the solid fuel solution to provide the composition of claim 1.

15. The method of claim 14, wherein the solvent is an organic or an inorganic solvent.

16. The method of claim 15, wherein the solvent is acetone.

\* \* \* \* \*